United States Patent [19]

Blatt

[11] Patent Number: 4,993,564
[45] Date of Patent: Feb. 19, 1991

[54] QUICK DISCONNECT TOOLING MOUNT

[76] Inventor: John A. Blatt, 47 Willison, Grosse Pointe Shores, Mich. 48236

[21] Appl. No.: 353,395

[22] Filed: May 17, 1989

[51] Int. Cl.$^5$ ............................................. B66C 23/70
[52] U.S. Cl. ..................................... 212/177; 173/22; 285/312; 285/320
[58] Field of Search ................... 212/177; 173/22, 39; 285/158, 189, 194, 128, 312, 320

[56] References Cited

U.S. PATENT DOCUMENTS

| | | | |
|---|---|---|---|
| 847,718 | 3/1907 | Ambos . | |
| 1,175,438 | 3/1916 | Gzapkaytic | 285/320 |
| 1,261,687 | 4/1918 | Brandon | 285/312 |
| 1,527,804 | 2/1925 | Kunst et al. . | |
| 1,594,224 | 7/1926 | Strongson . | |
| 2,444,147 | 7/1948 | Anderson et al. . | |
| 2,799,249 | 7/1957 | Lear | 173/22 |
| 2,837,749 | 6/1958 | Gross . | |
| 2,953,118 | 9/1960 | Flick et al. | 285/189 |
| 2,965,396 | 12/1960 | Reynolds et al. . | |
| 3,214,195 | 10/1965 | Zqhuranec et al. | 285/312 |
| 3,240,279 | 3/1966 | Dorkins . | |
| 3,314,698 | 4/1967 | Owens | 285/312 |
| 4,111,470 | 9/1978 | Welcker | 285/312 |
| 4,543,034 | 9/1985 | Blatt et al. . | |
| 4,596,415 | 6/1986 | Blatt . | |
| 4,650,234 | 3/1987 | Blatt . | |
| 4,898,287 | 2/1990 | Blatt . | |
| 4,905,850 | 3/1990 | Blatt . | |

OTHER PUBLICATIONS

PCT International Publication No. WO90/00515; Publication Date 1-25-90; Inventor: Blatt.

Primary Examiner—Sherman Basinger
Assistant Examiner—Thomas J. Brahan
Attorney, Agent, or Firm—Basile and Hanlon

[57] ABSTRACT

A quick disconnect tooling mount having integral fluid conduits for use with lower tooling nests having changeable tooling assemblies. The coupling uses a rotary locking member, having an eccentric cam disposed thereon which rigidly clamps the lower tooling mount to the upper tooling mount by engaging a guide rod configured in a male/female arrangement and inserted from a first coupling block attached to the upper tooling mount into the second lower tooling mount attached to the tool nest.

22 Claims, 3 Drawing Sheets

QUICK DISCONNECT TOOLING MOUNT

CROSS REFERENCE TO RELATED APPLICATIONS

This application is a continuation-in-part of U.S. Ser. No. 07/215,743 filed on July 6, 1988, now U.S. Pat. No. 4,898,287 and U.S. Ser. No. 07/290,653 filed on Dec. 27, 1988, now U.S. Pat. No. 4,905,850.

BACKGROUND OF THE INVENTION

1. Field of the Invention

The present invention is concerned with a quick disconnect tooling mount having integral fluid and electrical lines of the type used with tooling nests having changeable tooling assemblies.

2. Description of the Relevant Art

Hydraulic and pneumatic tooling units are widely used in industry at automated work stations and the like. The units are relatively heavy and do not lend themselves to convenient removal and replacement. Connection of the tooling nests to their related equipment is generally carried out by bolting the tooling nests to the equipment and subsequently attaching flexible fluid lines for operation of hydraulic or pneumatic equipment attached to the tooling nests. This exposes the flexible connections to severe shop environments, thereby reducing the reliability and life of the equipment. Additionally, no provision is made for electrical wiring which is required to transfer electrical signals to the tooling nests and associated attachments. Such an assembly is relatively complex, expensive, and requires extensive down time for tooling nest replacement.

The above shortcomings are addressed by the design of the present invention.

SUMMARY OF THE INVENTION

The present invention comprises a quick disconnect tooling mount having integral fluid and electrical lines which directly connect the fluid passages and the electrical wiring of a master unit to those of a removable tooling nest assembly. This eliminates the need for external fluid and electrical connections, and greatly reduces the time required for replacement of tooling nests.

The quick disconnect tooling mount of the present invention comprises upper and lower coupling members each having respective end faces which are adapted to be seated in face-to-face engagement with one another. Guide rods through which fluid passages extend, project outwardly in a parallel relationship from the end face of one of the members. Guide rod receiving bores, which correspond in number to that of the guide rods, extend into a corresponding coupling member along parallel axes which are coaxial to the axes of the guide rods. The bores are adapted to matingly receive the guide rods therein so as to guide the coupling members to and from a coupled position. Fluid passages extend through the upper and lower coupling members with the fluid passages formed in the coupling member in which the guide rods are inserted being in communication with the fluid passages formed in the guide rods. In the coupling member in which the guide rod receiving bores are formed, the fluid passages communicate with the end portions of the bores so that the fluid passages in the first coupling member, the guide rods and those in the second coupling member may be placed in fluid communication therewith when the coupling members are seated in face-to-face engagement.

In order to prevent separation of the upper and lower coupling members when the tooling nest is in use, a locking means disposed within the second coupling member is operable to retain the guide rods in engagement within the bores. The locking means comprises a locking member mounting bore which extends through the second coupling member along an axis which is normal to, and offset from, the guide rod receiving bores. The locking member mounting bore intersects the guide rod receiving bore so that a rotary locking member mounted within the locking member mounting bore, and having a cam locking means disposed thereon, can enable the guide rods when the coupling members are in a coupled position to retain the members in engagement therewith. Furthermore, passages are formed through the upper and lower coupling members for routing of electrical wiring therethrough. At corresponding positions on the end faces of the coupling members, connector means are disposed for connecting the electrical wiring in the upper coupling member with corresponding wiring in the lower coupling member when the faces are placed in face-to-face engagement allowing electrical signals to be transferred through the tooling mount to attached tooling nests.

In operation, clamping of the lower tooling nest to the upper mount unit is achieved by engaging the guide rods with the corresponding guide rod receiving bores in the corresponding coupling member. Initial engagement is carried out while the rotary locking member is in a non-interference position. After engagement, the cam looking mechanism is rotated to lock the eccentric cam member into grooves in the guide rods.

Removal of the tooling nests from the master unit for replacement or repair, is achieved by rotating the locking member from the locked position to the non-interference position. This allows the guide rods to be slidingly removed from the guide rod receiving bores.

Other objects and features of the invention will become apparent by reference to the following specification and to the drawings.

DESCRIPTION OF THE PREFERRED EMBODIMENT

Figure 1:
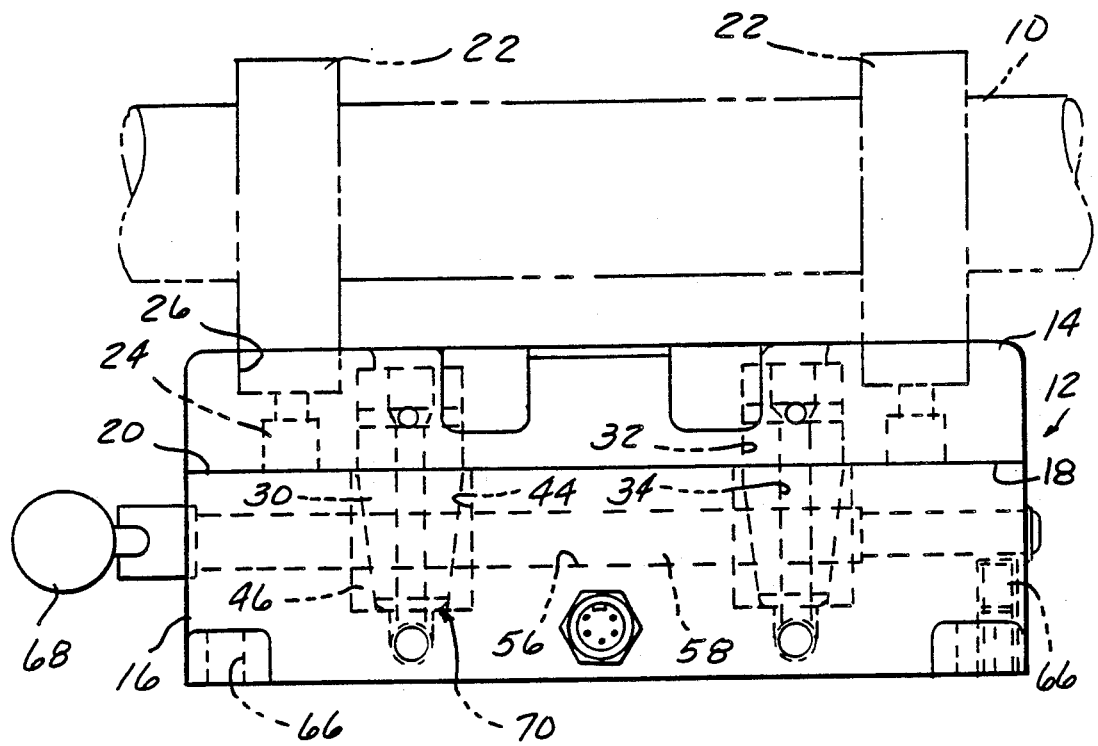
FIG. 1 is a side view of a quick disconnect tooling mount of the present invention with guide rods and locking means shown in phantom.

In FIG. 1, there is shown in phantom, a portion of a transfer boom assembly, designated generally as 10, to which a quick disconnect tooling mount 12, embodying the present invention, has been attached. The quick disconnect tooling mount assembly comprises an upper or first coupling member 14 and a lower or second coupling member 16 The coupling members 14 and 16 have respective end faces 18 and 20 which are adapted to be seated in face-to-face engagement.

Figure 8:
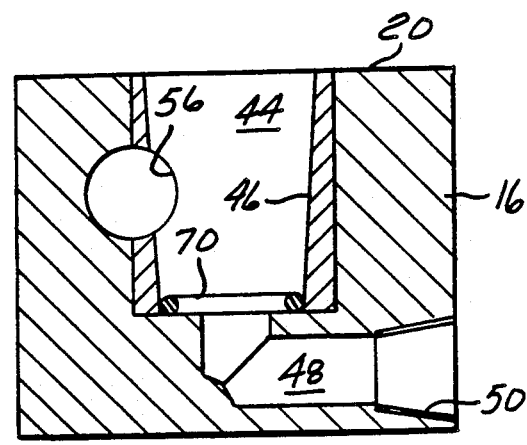
FIG. 8 is a sectional view taken along line 8—8 of FIG. 4 showing the intersection of the looking member mounting the guide rod receiving bore.

First coupling member 14 is fixedly attached to transfer boom 10 utilizing yoke 22 which is fastened to coupling member is utilizing suitable fasteners such as bolts 24. Yoke 22 engages coupling member 14 at attachment positions 26 (see FIG. 3). Bolts 24 pass through bolt holes 28 formed in coupling member 14 and into the base of yoke 22 providing an exceptionally rigid mounting of coupling member 14 to transfer boom 10. The first coupling member 14 is generally not removed from the transfer boom 10 unless damaged or until the work station, including the transfer boom 10, is modified. A series of guide rods 30, shown in FIG. 8, are fixedly mounted in guide rod receiving bores 32 which extend into end face 18. The guide rods 30 project outwardly from end face 18 in a spaced, parallel relationship to each other. The guide rods have slightly tapered end portions, shown in FIG. 3, which form a generally frusto-conical shape. The tapering of the guide rod ends allow the guide rods to slidingly engage rod receiving bores, to be described below, without binding or jamming, as would be the case with cylindrically shaped guide rods.

Figure 3:
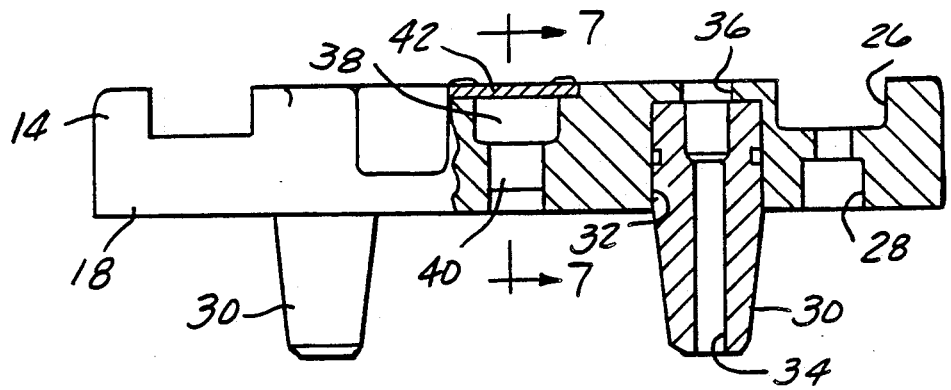
FIG. 3 is a side view, partially in section, of a first coupling member.

Additionally, guide rods 30 have fluid passages 34 extending longitudinally therethrough. The fluid passages 34 are designed to communicate with corresponding fluid passages 36 formed in first coupling member 14. As seen in FIG. 3 fluid passages 36 provide fluid communication between the guide rods and the exterior of the coupling member for attachment of fluid lines (not shown) routed through transfer boom 10.

Figure 3A:
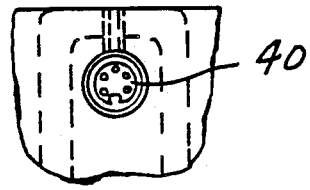
FIG. 3A is a partial top view of the coupling member of FIG. 3 showing the electrical connection.
Figure 7:
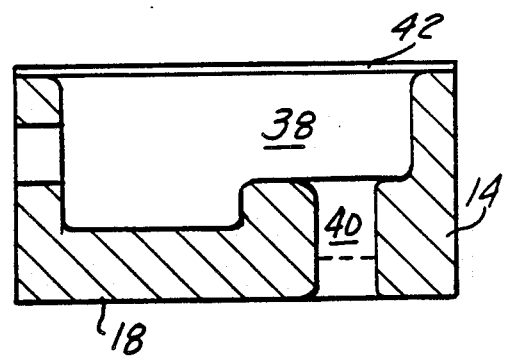
FIG. 7 is a sectional view taken along line 7—7 of FIG. 3.

In a manner similar to the routing of fluid passages 34 and 36 through coupling member 14, electrical passages 38 (see FIGS. 3 and 7) are provided for routing electrical lines from transfer boom 10 through quick disconnect tooling mount assembly 12. Electrical lines may be passed through electrical passages 38 to terminate at connector 40 (see FIG. 3A). An access panel 42 is provided to allow installation or repair of electrical wiring routed from transfer boom 10 to connector 40.

Figure 4A:
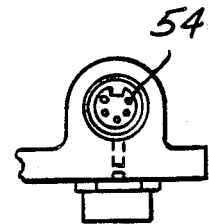
FIG. 4A is a partial top view showing the electrical connection on the mating surface of the coupling member of FIG. 4.
Figure 4:
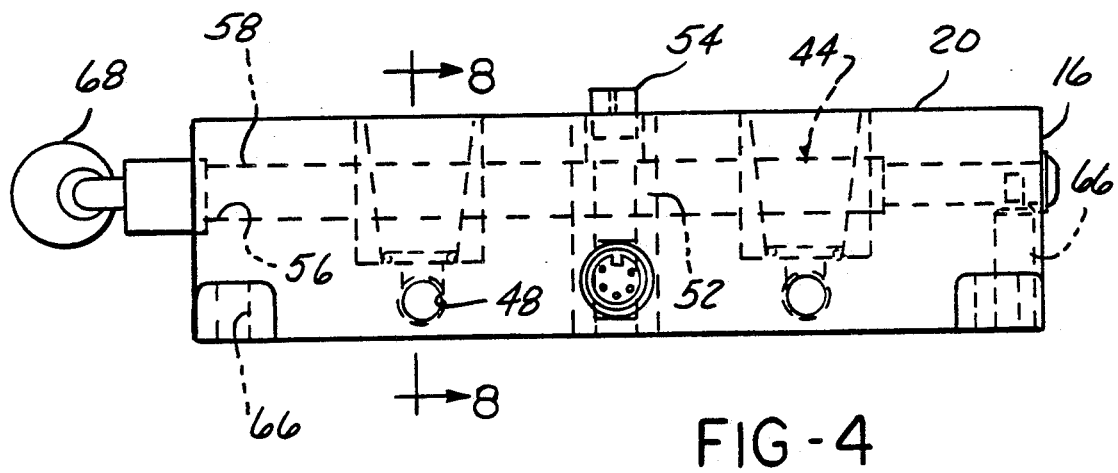
FIG. 4 is a side view of a second coupling member with guide rod receiving bores and rotary locking members shown in phantom.

Guide rod receiving bores 44, shown in FIG. 4, extend into second, lower coupling member 16 from end face 20. The guide rod receiving bores 44 correspond in number to the guide rods 30 and are similarly spaced in a parallel relationship having axes coaxial to guide rods 30 so as to be adapted to slidably receive the guide rods when the end faces 18 and 20 of first and second coupling members 14 and 16 are seated in face-to-face engagement. Sleeves 46 may be placed within guide rod receiving bores 44 to duplicate the tapered configuration of guide rods 30 thereby providing a tight fit in which the guide rod faces are seated adjacent to sleeves 46.

As with first coupling member 14, fluid passages 48 (see FIG. 8) extend through second coupling member 16 from the base or blind end of guide rod receiving bore 44 to connecting point 50, positioned at the exterior of the coupling member. An electrical connector 54 (see FIG. 4A) corresponding to connector 40 of first coupling member 14, is positioned on end face 20 of lower coupling member 16 to engage connector 40 when the coupling members are brought into face-to-face engagement. Coupling of electrical connector 40 with connector 54 allows electrical connection to be established between transfer boom 10, through the quick disconnect tooling mount assembly 12, to tooling nests mounted to lower coupling member 16. As a result, control signals may be conveniently routed through the transfer boom and tooling mount assembly negating the need for external wiring harnesses which are subject to damage in harsh environments.

When end face 18 of upper coupling member 14 is brought into face-to-face engagement with end face 20 of second coupling member 16 guide rods 30 slidingly engage guide rod receiving bores 44. Once in engagement the fluid passages 34 and 36 disposed in guide rods 30 and upper coupling member 14, are brought into fluid engagement with fluid passages 48, disposed in lower coupling member 16. Thus, in a similar fashion to the establishment of electrical connection between the transfer boom and the lower tooling nests attached to the second coupling member 16, fluid connections are established between fluid lines of transfer boom 10 and connecting point 50 of lower coupling member 16 thereby allowing fluid connection to be made to lower tooling nests which are attached to second, lower coupling member 16.

Figure 2:
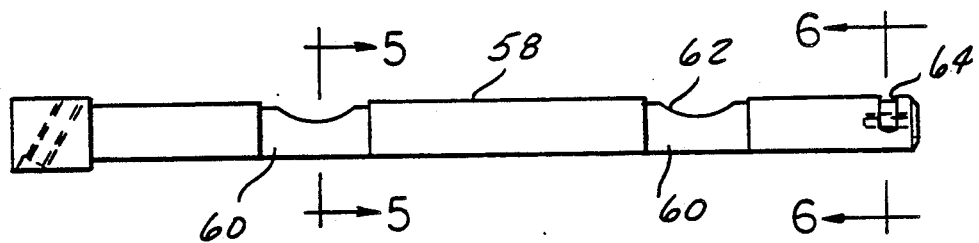
FIG. 2 is a side view of a rotary locking member.
Figure 5:
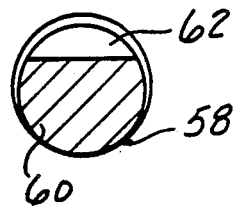
FIG. 5 is a sectional view taken along line 5—5 of FIG. 2 showing the eccentric cam portion of a rotary locking member.
Figure 6:
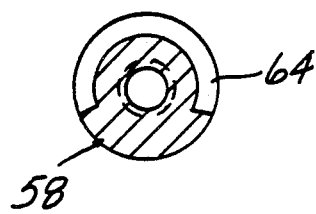
FIG. 6 is a sectional view taken along line 6—6 of FIG. 2 showing the rotational limit groove formed about the external circumference of the rotary locking member.

In order to maintain first, upper coupling member 14 in fluid tight engagement with second, lower coupling member 16, while allowing ease of separation, should it be desirable to remove lower coupling member 16 and its associated tooling nest, a locking member mounting bore 66 is provided which extends through second coupling member 16 along an axis normal to, and offset from, the axes of guide rod receiving bores 44 as shown in FIG. 8. The looking member mounting bore 56 partially intersects guide rod receiving bores 44 thereby creating an interference. Rotatably mounted within locking member mounting bore 56 is a rotary locking member 58, shown in FIG. 2. Formed on rotary locking member 58 are eccentric cam portions 60 (FIG. 5) located at the intersections of the locking member mounting bore 56 and guide rod receiving bores 44. Diametrically opposed to eccentric cam portions 60 are clearance recesses 62. Additionally, a groove 64, shown in FIG. 6, may be formed about the circumference of one end of rotary locking member 58. Groove 64 describes a predetermined arc about the circumference of rotary locking member 58 so that when locking member 58 is positioned within lower coupling member 16, pin stop 66 slidingly engages groove 64 to limit rotation of rotary locking member 58 within locking member mounting bore 56 to the predetermined arc of groove 64.

Figure 9:
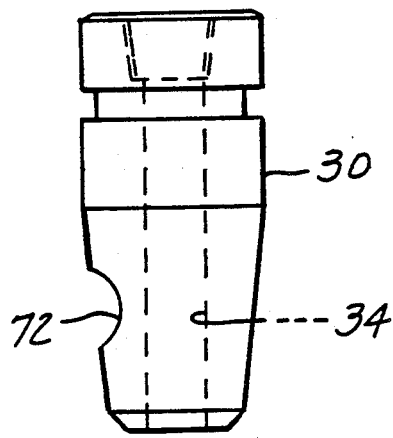
FIG. 9 is a side view of a guide rod.
Figure 10:
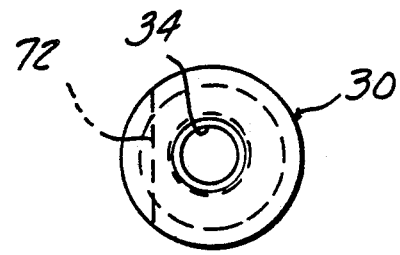
FIG. 10 is a top view of the guide rod shown in FIG. 9.

In operation, a tool assembly or tooling nest is attached to lower coupling member 16 utilizing bolts which pass through bolt holes 66 formed in lower coupling member 16. Other fastening means may be used depending on the application and manufacturing requirements. Subsequently, rotary locking member 58, installed in coupling member 16, is rotated using handle 68, into a non-interference position in which clearance recesses 62 are positioned to face guide rod receiving bores 44 to accommodate insertion of guide rods 30 into receiving bores 44. Lower coupling member 10, and its associated tooling nest, is then brought into position to allow guide rods 80 to slidingly engage guide rod receiving bores 44 thereby cooperating to guide coupling members 14 and 16 into a face-to-face coupled position in which fluid and electrical connections are established between upper and lower coupling members. Seating means, such as O-rings 70, are provided between guide rods 30 and guide rod receiving bores 44 to establish a fluid-tight seal between coupling members 14 and 16. Subsequently, rotary locking member 58 is rotated to a locked position in which eccentric cam portions 30 engage cam receiving recesses 72, formed in guide rods 30, (see FIGS. 9 and 10) to retain coupling members 14 and 18 in a coupled position. Removal of lower tooling member 16 and its associated tooling nest is simply the reversal of installation.

While certain embodiments of the invention have been described in detail above in relation to a quick disconnect tooling mount, it will be apparent to those skilled in the art that the disclosed embodiment may be modified. Therefore, the foregoing description is to be considered exemplary rather than limiting, and the true scope of the invention is that defined in the following claims.

What is claimed is:

1. A quick disconnect tooling mount comprising:
   a first and a second coupling member having respective end faces adapted to be seated in face-to-face engagement;
   a first and a second guide rod fixedly mounted in said first coupling member and projecting in an outwardly extending relationship from said end face of said first coupling member;
   means defining a first and a second guide rod receiving bore, extending into said second coupling member from said end face of said member, adapted to slidably receive said first and said second guide rod respectfully, said first and said second guide rod and said first and second receiving bore cooperating to guide said coupling members to and from a coupled position;
   means defining a locking member mounting bore, extending through said second coupling member along an axis normal to, and offset from said first and said second guide rod receiving bore, said locking member mounting bore intersecting at least one of said first and said second guide rod receiving bore;
   a rotary locking member mounted within said locking member mounting bore for rotation therein; and
   locking means, disposed on said rotary locking member, for engagement with at least one of said first and said second guide rod when said coupling members are in a coupled position, to retain said members in said coupled position.

2. A quick disconnect tooling mount, as defined in claim 1, further comprising:
   a fluid passage extending longitudinally through at least one of said first and said second guide rod;
   fluid passages extending through said first and said second coupling members, said fluid passage in said first coupling member having a first end in communication with said fluid passage in said respective guide rod and a second end in communication with the exterior of said coupling member, and said fluid passage in said second coupling member having a first end in communication with said respective guide rod receiving bore and a second end in communication with the exterior of said second coupling member;
   said fluid passage in said first coupling member and said respective guide rod engageable, in coaxial communication, with said fluid passage in said second coupling member when said coupling members are in said coupled position.

3. A quick disconnect tooling mount, as defined in claim 2, further comprising sealing means disposed between said respective guide rod and said second coupling member.

4. A quick disconnect tooling mount, as defined in claim 1, wherein each of said outwardly extending guide rod end further comprises a tapered end portion of a generally frusto-conical shape.

5. A quick disconnect tooling mount, as defined in claim 1, each of said guide rod further comprising:
   a cam receiving recess formed in the exterior of said guide rod at a longitudinal position corresponding to said interference position of said locking member mounting bore when said first and said second guide rod are slidably received within said first and said second guide rod receiving bore.

6. A quick disconnect tooling mount, as defined in claim 5, said looking means further comprising:
   an eccentric cam portion on said locking member at the intersection cf said locking member mounting bore and said first and said guide rod receiving bore;
   a clearance recess in said locking member, diametrically opposed to said eccentric cam portion;
   said rotary member being rotatable within said locking member mounting bore between a release position, in which said clearance recess is positioned to accommodate insertion or withdrawal of said first and said second guide rod into or from said first and said second guide rod receiving bore, and a locked position in which said cam portion is engaged within said cam receiving recess to retain said coupling members in a coupled position.

7. A quick disconnect tooling mount, as defined in claim 1, said rotary locking member further comprising:
   a groove formed about a predetermined arc of the circumference of said rotary locking member;
   a pin stop, disposed in said second coupling member and projecting into said looking member mounting bore for sliding engagement with said groove to limit rotation of said rotary locking member within said locking member mounting bore to said predetermined arc.

8. A quick disconnect tooling mount comprising:
   a first and a second coupling member having respective end faces adapted to be seated in face-to-face engagement;
   a guide rod fixedly mounted in said first coupling member and projecting in an outwardly extending relationship from said end face of said first coupling member;
   means defining a guide rod receiving bore, extending into said second coupling member from said end face of said member, adapted to slidably receive said guide rod, said guide rod and said receiving bore cooperating to guide said coupling members to and from a coupled position;

means defining a locking member mounting bore, extending through said second coupling member along an axis normal to, and offset from said guide rod receiving bore, said locking member mounting bore intersecting said guide rod receiving bore;

a rotary locking member mounted within said locking member mounting bore for rotation therein;

locking means, disposed on said rotary locking member, for engagement with said guide rod when said coupling members are in a coupled position, to retain said members in said coupled position;

electrical means extending through said first and second coupling members; and electrical connector means, connected to said electrical means, disposed at the faces of said coupling members for connecting said electrical means in said first and second coupling members when said coupling members are in a coupled position.

9. A quick disconnect tooling mount comprising:

a first and second coupling member having respective end faces adapted to be seated in face-to-face engagement;

a guide rod, having a fluid passage extending therethrough, fixedly mounted in said first coupling member to project in an outwardly extending relationship from said end face of said first coupling member and having a tapered end portion of a generally frusto-conical shape;

means defining a guide rod receiving bore extending into said second coupling member from said end face of said member, adapted to slidably receive said guide rod, having sealing means disposed therein, said guide rod, said receiving bore, and said sealing means cooperating to guide said coupling members to and from a coupled, sealed position;

fluid passages extending through said first and said second coupling members, said fluid passage in said first coupling member having a first end in communication with said fluid passage in said guide rod and a second end in communication with the exterior of said coupling member, and said fluid passage in said second coupling member having a first end in communication with said guide rod receiving bore and a second end in communication with the exterior of said second coupling member, said fluid passage in said first coupling member and said guide rod engageable, in coaxial communication, with said fluid passage in said second coupling member when said coupling members are in said coupled position;

means defining a looking member mounting bore extending through said second coupling member along an axis normal to, and offset from, said guide rod receiving bore, said locking member mounting bore intersecting said guide rod receiving bore;

a cam receiving recess formed in the exterior of said guide rod at a longitudinal position corresponding to said intersecting position of said locking member mounting bore when said guide rod is slidably received within said guide rod receiving bore;

a rotary locking member mounted within said locking member mounting bore for rotation therein having an eccentric cam portion on said locking member at the intersection of said looking member mounting bore and said guide rod receiving bore, a clearance recess in said locking member, diametrically opposed to said eccentric cam portion, said rotary member being rotatable within said looking member mounting bore between a release position, in which said clearance recess is positioned to accommodate insertion or withdrawal of said guide rod into or from said guide rod receiving bore, and a locked position in which said cam portion is engaged within said cam receiving recess to retain said coupling members in a coupled position; and electrical means extending through said first and second coupling members;

electrical connector means, connected to said electrical means, disposed at the faces of said coupling members for connecting said electrical means in said first and second coupling members when said coupling members are in a coupled position.

10. A quick disconnect tooling mount comprising:

a first and a second coupling member having respective end faces adapted to be seated in face-to-face engagement;

guide rods fixedly mounted in said first coupling member and projecting outwardly in a spaced, parallel relationship from said end face of said first coupling member;

means defining guide rod receiving bores corresponding in number to said guide rods extending in to said second coupling member along spaced parallel axes coaxial to said guide rods from said end face of said member adapted to slidably receive said guide rods, said guide rods and said receiving bores cooperating to guide said coupling members to and from a coupled position;

means defining a looking member mounting bore, extending through said second coupling member along an axis normal to, and offset from said guide rod receiving bores, said locking member mounting bore intersecting said guide rod receiving bores;

a rotary locking member mounted within said locking member mounting bore for rotation therein; and locking means, disposed on said rotary locking member, for engagement with said guide rods when said coupling members are in a coupled position, to retain said members in said coupled position.

11. A quick disconnect tooling mount, as defined in claim 10, further comprising:

fluid passages extending longitudinally through said guide rods; and fluid passages extending through said first and said second coupling members, said fluid passages in said first coupling member having first ends in communication with said fluid passages in said guide rods and second ends in communication with the exterior of said coupling member, and said fluid passages in said second coupling member having first ends in communication with said guide rod receiving bores and second ends in communication with the exterior of said second coupling member; said fluid passages in said first coupling member and said guide rods engageable, in coaxial communication, with said fluid passages in said second coupling member when said coupling members are in said coupled position.

12. A quick disconnect tooling mount, as defined in claim 11, further comprising sealing means disposed between said guide rods and said second coupling member.

13. A quick disconnect tooling mount, as defined in claim 10, said guide rods further comprising tapered end portions of a generally frusto-conical shape.

14. A quick disconnect locking mount, as defined in claim 10, said guide rods further comprising:
cam receiving recesses formed in the exterior of said guide rods al a longitudinal position corresponding to said interference position of said locking member mounting bore when said guide rods are slidably received within said guide rod receiving bores.

15. A quick disconnect tooling mount, as defined in claim 14, said locking means further comprising:
eccentric cam portions formed on said locking member at the intersection of said looking member mounting bore and said guide rod receiving bores; and
clearance recesses formed in said locking member, diametrically opposed to said eccentric cam portions;
said rotary member being rotatable within said locking member mounting bore between a release position, in which said clearance recesses are positioned to accommodate insertion or withdrawal of said guide rods into or from said guide rod receiving bores, and a locked position in which said cam portions are engaged within said cam receiving recesses to retain said coupling members in a coupled position.

16. A quick disconnect tooling mount as defined in claim 10, said rotary locking member further comprising:
a groove formed about a predetermined arc of the circumference of said rotary locking member; and
a pin stop, disposed in said second coupling member and projecting into said locking member mounting bore for sliding engagement with said groove to limit rotation of said rotary locking member within said locking member mounting bore to said predetermined arc.

17. A quick disconnect tooling mount, as defined in claim 10, further comprising:
electrical means extending through said first and second coupling members;
electrical connector means, connected to said electrical means, disposed at the said faces of said coupling members for connecting said electrical means in said first and second coupling members when said coupling members are in a coupled position.

18. A quick disconnect tooling mount comprising:
a first and second coupling member having respective end faces adapted to be seated in face-to-face engagement;
guide rods, having fluid passages extending therethrough, fixedly mounted in said first coupling member to project outwardly in a spaced, parallel relationship from said end face of said first coupling member and having tapered end portions of a generally frusto-conical shape;
means defining guide rod receiving bores corresponding in number to said guide rods, extending into said second coupling member along spaced, parallel axes coaxial to said guide rods from said end face of said member, adapted to slidably receive said guide rods, having sealing means disposed therein said guide rods, said receiving bores, and said sealing means cooperating to guide said coupling members to and from a coupled, sealed position;
fluid passages extending through said first and said second coupling members, said fluid passages in said first coupling member having first ends in communication with said fluid passages in said guide rods and second ends in communication with the exterior of said coupling member, and said fluid passages in said second coupling member having first ends in communication with said guide rod receiving bores and second ends in communication with the exterior of said second coupling member, said fluid passages in said first coupling member and said guide rods engageable, 16 coaxial communication, with said fluid passages in said second coupling member when said coupling members are in said coupled position;
means defining a locking member mounting bore, extending through said second coupling member along an axis normal to, and offset from said guide rod receiving bores said locking member mounting bore intersecting said guide rod receiving bores;
cam receiving recesses formed in the exterior of said guide rods at longitudinal positions corresponding to said interference positions of said locking member mounting bore with said guide rods when said guide rods are slidably received within said guide rod receiving bores;
a rotary locking member mounted within said locking member mounting bore for rotation therein, having eccentric cam portions formed on said locking member at the intersection of said locking member mounting bore and said guide rod receiving bores, clearance recesses formed in said locking member, diametrically opposed to said eccentric cam portions, said rotary member being rotatable within said locking member mounting bore between a release position, in which said clearance recesses are positioned to accommodate insertion or withdrawal of said guide rods into or from said guide rod receiving bores, and a locked position in which said cam portions engage said cam receiving recesses in said guide rods to retain said coupling members in a coupled position;
electrical means extending through said first and second coupling members; and
electrical connector means, connected to said electrical means, disposed at the faces of said coupling members for connecting said electrical means in said first and second coupling members when said coupling members are in a coupled position.

19. A quick disconnect tooling mount comprising:
a first and a second coupling member having respective end faces adapted to be seated in face-to-face engagement;
a plurality of guide rods fixedly mounted to said first coupling member and projecting in an outwardly extending relationship from an end face of said first coupling member;
said second coupling member having a plurality of guide rod receiving bores extending along respective axes from an end face of said second coupling member to attach and support said coupling members in said face-to-face engagement; and
means defining a locking member carried by one of said coupling members for engagement with at least one of said plurality of guide rods at a location offset from said respective bore axis when said coupling members are attached to lockingly retain said coupling members.

20. The quick disconnect tooling mount, as defined in claim 19, further comprising:
   a fluid passage extending longitudinally through at least one of said guide rods;
   fluid passages extending through said first and said second coupling members, said fluid passage in said first coupling member in communication with said fluid passage in said at least one guide rod, and said fluid passage in said second coupling member in communication with at least one of said guide rod receiving bores; and
   said fluid passage in said guide rod being in communication with said fluid passage in said second coupling member when said coupling members are attached in said face-to-face engagement.

21. The quick disconnect tooling mount, as defined in claim 20, further comprising sealing means disposed between said at least one guide rod and said second coupling member.

22. A quick disconnect tooling mount comprising:
   a first and a second coupling member having respective end faces adapted to be seated in face-to-face engagement;
   a guide rod fixedly mounted to said first coupling member and projecting in an outwardly extending relationship from an end face of said first coupling member;
   said second coupling member having a guide rod receiving bore extending along an axis from an end face of said second coupling member to attach and support said coupling members in said face-to-face engagement;
   means defining a locking member carried by one of said coupling members for engagement with said guide rod at a location offset from said bore axis when said coupling members are attached to lockingly retain said coupling members;
   a fluid passage extending longitudinally through said guide rod;
   fluid passages extending through said first and said second coupling members, said fluid passage in said first coupling member in communication with said fluid passage in said guide rod, and said fluid passage in said second coupling member in communication with said guide rod receiving bore;
   said fluid passage in said guide rod being in communication with said fluid passage in said second coupling member when said coupling members are attached in said face-to-face engagement;
   sealing means disposed between said guide rod and said second coupling member; and
   a plurality of said guide rods and said receiving bores for receiving said guide rods to attach said coupling members.

* * * * *

UNITED STATES PATENT AND TRADEMARK OFFICE
CERTIFICATE OF CORRECTION

PATENT NO. : 4,993,564

DATED : February 19, 1991

INVENTOR(S) : John A. Blatt

It is certified that error appears in the above-identified patent and that said Letters Patent is hereby corrected as shown below:

In the drawings, Sheet 1, Fig. 1, reference numeral "66" applied to the pin stop should be changed to --76-- as shown below:

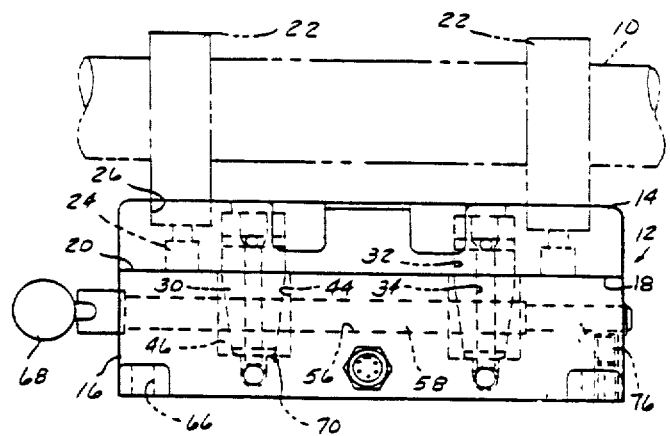

FIG-1

UNITED STATES PATENT AND TRADEMARK OFFICE
CERTIFICATE OF CORRECTION

PATENT NO. : 4,993,564
DATED : February 19, 1991
INVENTOR(S) : John A. Blatt

It is certified that error appears in the above-identified patent and that said Letters Patent is hereby corrected as shown below:

In the drawings, Sheet 2, Fig. 4, reference numeral "66" applied to the pin stop should be changed to --76--; and the arrowed leader line corresponding to guide rod receiving bore 44 should be moved upward, as shown below:

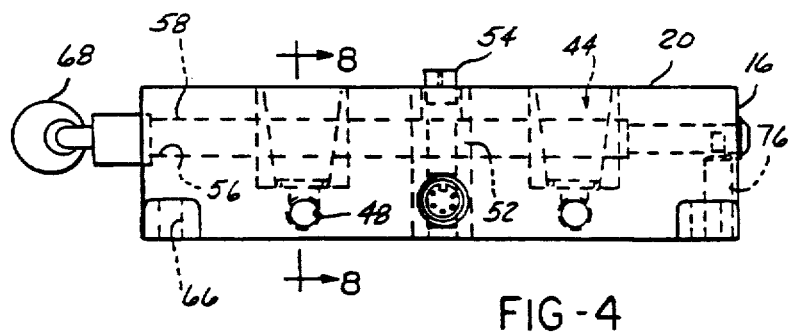

FIG-4

UNITED STATES PATENT AND TRADEMARK OFFICE
CERTIFICATE OF CORRECTION

PATENT NO. : 4,993,564

DATED : February 19, 1991

INVENTOR(S) : John A. Blatt

It is certified that error appears in the above-identified patent and that said Letters Patent is hereby corrected as shown below:

Column 2, line 33, delete "looking" and insert --locking--; line 48, delete "phantom" and insert --hidden line--; line 56, delete "phantom" and insert --hidden line--.

Column 3, line 2, delete "looking" and insert --locking--; line 3, after "mounting", insert --bore with--; line 16, after "16" first occurrence, insert --.--; line 21, delete "is" and insert --14--; line 30, delete "8" and insert --3--.

Column 4, line 42, delete "66" and insert --56--; line 45, delete "looking" and insert --locking--; line 60, delete "66" and insert --76--.

Column 5, line 5, delete "10" and insert --16--; line 7, delete "80" and insert --30--; line 11, delete "Seating" and insert --Sealing--; line 16, delete "30" and insert --60--; line 19, delete "18" and insert --16--; line 19, delete "tooling" and insert --coupling--.

Column 5:
Claim 1, line 43, delete "respectfully" and insert --respectively--.

Column 6:
Claim 6, line 31, delete "looking" and insert --locking--; line 34, after "said" second occurrence, insert --second--.

Claim 7, line 52, delete "looking" and insert --locking--.

Column 7:
Claim 9, line 54, delete "looking" and insert --locking--; line 67, delete "looking" and insert --locking--; Column 8, line 3, delete "looking" and insert --locking--; line 10, delete "and"; line 12, after "members;" insert --and--.

UNITED STATES PATENT AND TRADEMARK OFFICE
CERTIFICATE OF CORRECTION

PATENT NO. : 4,993,564

DATED : February 19, 1991

INVENTOR(S) : John A. Blatt

It is certified that error appears in the above-identified patent and that said Letters Patent is hereby corrected as shown below:

Column 8:

Claim 10, line 27, delete "in" second occurrence, and insert --into--; line 28, delete "to"; line 34, delete "looking" and insert --locking--.

Column 9:

Claim 14, line 4, delete "locking" and insert --tooling--; line 7, delete "al" and insert --at--.

Claim 15, line 15, delete "looking" and insert --locking--.

Claim 18, line 67, after "therein" insert --,--; Column 10, line 14, delete "16" and insert --in--; line 21, after "bores" insert --,--.

Signed and Sealed this

Fifth Day of January, 1993

Attest:

DOUGLAS B. COMER

Attesting Officer

Acting Commissioner of Patents and Trademarks